3,442,843
PREPARATION OF SELF-CROSSLINKING POLYURETHANE DISPERSIONS
Wolfgang Keberle, Bergisch-Neukirchen, and Dieter Dieterich, Leverkusen, Germany, assignors to Farbenfabriken Bayer Aktiengesellschaft, Leverkusen, Germany, a corporation of Germany
No Drawing. Filed June 17, 1966, Ser. No. 558,228
Claims priority, application Germany, June 18, 1965, F 46,364
Int. Cl. C08g 53/18, 51/76, 51/80
U.S. Cl. 260—29.2
9 Claims

ABSTRACT OF THE DISCLOSURE

Self-crosslinking dispersions or aqueous colloidal solutions are prepared by reacting a polyurethane prepared from an organic polycyanate and an active hydrogen-containing compound with a compound containing at least one isocyanate or one isothiocyanate compound and at least one alkoxymethyl isocyanate or isothiocyanate compound and subsequently with a compound containing a cyclic ring or a compound having at least one active hydrogen atom and at least one salt-type or salt-forming group and dispersing the thus formed modified polyurethane in an aqueous polyurethane dispersion.

---

This invention relates to polyurethane dispersions and a method of preparing the same. More particularly, it relates to self-crosslinking dispersions.

The preparation of aqueous dispersions or aqueous colloidal solutions of polyurethane is already known. Under the conditions employed in the known processes, the products obtained are predominantly linear and not crosslinked and therefore soluble or dispersible in suitable solvents. Polyurethane of this kind contain salt-type groups such a quaternary ammonium groups, carboxylate or sulphonate groups which impart to the polyurethanes the property of being soluble or dispersible in water. In spite of their linear, non-crosslinked structure, the polyurethane synthetic resins which can be isolated from the aqueous solutions and dispersions generally have very good properties as solids, such as high tensile strength, hardness and elasticity and are equal to their mechanical properties to crosslinked elastomers. The resistance of such cationic or anionic polyurethanes to water is usually surprisingly high although in some cases, their tendency to swell in water is greater than that of non-ionic polyurethanes. Their behavior towards aqueous organic solvents such as 70% acetone, 90% tretrahydrofuran, 90% dioxane or 80% glycol monomethyl ether acetate is unfavorable. Most polyurethane polyelectrolytes dissolve in such mixtures of organic solvents and water whereas the pure solvents only have a swelling effect. It was therefore an important technical advance to recognize that such cationic or anionic polyurethan polyelectrolytes can be crosslinked very readily via groups with formaldehyde, compounds which give off formaldehyde or compounds which react like formaldehyde. Even polyurethanes which are built up from polyethers and aromatic diisocyanates can be directly crosslinked in salt form at 100° with formaldehyde.

In practice, however, the formaldehyde crosslinking from the two-component system has some disadvantages. Thus, in the process of crosslinking with formaldehyde itself, which is added in the form of an aqueous solution to the polyurethane solutions or dispersions, a certain amount of evaporation of the crosslinking agent invariably takes place as a result of which it is difficult to dose in a reproducible manner. Sheet structures crosslinked with formaldehyde frequently retain a sticky surface. Liquid crosslinking agents such as derivatives of methylol urea, methylol melamine and the like have the disadvantage of acting as plasticizers in the non-crosslinked state, which is a serious disadvantage, for example, during the slow crosslinking of lacquer layers. The advantageous properties for practical purposes obtained by the crosslinking, such as high mechanical strength and resistance to solvents, in some cases only appear if the crosslinking has proceeded quantitatively. In the case of less reactive substrates, e.g., only very weakly ionic or non-ionic polyurethanes, this process may take a considerable time. Moreover, in such a case, there is a risk that the crosslinking agent if used in relatively high doses may react merely with itself instead of with the polyurethane. Some crosslinking agents, for example, hexamethylolmelamine ether, have a weakly basic character and together with the acid catalyst, they take on the character of an electrolyte, as a result of which they have a precipitating effect on sensitive dispersions, especially those of a cationic nature. Lastly, numerous crosslinking agents are insoluble in water and therefore, not very suitable for the crosslinking of aqueous dispersions.

The manufacturer requires in particular, systems which consist only of one component and the solvent or dispersing agent and which can be stored indefinitely at room temperature and undergo crosslinking on the substrate during drying at room temperature or a higher temperature. The present invention makes such systems accessible.

It is therefore an object of this invention to provide polyurethane plastics which will cure at room temperature or slightly elevated temperatures. It is another object of this invention to provide aqueous dispersions of polyurethane polymers capable of curing at room temperature. It is another object of this invention to provide aqueous dispersions of ionic polyurethanes which will deposit a film that exhibits good physical properties.

The foregoing objects and others which will become apparent from the following description are accomplished in accordance with the invention generally speaking by providing a process for the preparation of self-crosslinking dispersions and aqueous colloidal solutions of polyurethanes prepared by the isocyanate polyaddition process by reacting an organic compound which contains reactive hydrogen atoms which are reactive with NCO groups and having a molecular weight of 300 to 20,000, an organic polyisocyanate and reacting the prefabricated polyurethane with free NCO-groups or free hydroxyl groups with compounds which contain at least one isocyanate group and at least one alkoxymethyl group and dispersing the thus formed modified polyurethane in an aqueous solution or dispersion. The prefabricated polyurethane can either contain salt-type groups or such are originated after the addition of the alkoxymethylisocyanates. In the latter case, (1) the polyurethane already contains salt-forming groups which makes necessary to add neutralizing or quaternizing agents after the addition of the alkoxymethyl isocyanate or (2) the polyurethane does not contain either salt-type or salt-forming groups which are in such case introduced into the molecule after the addition of the alkoxymethylisocyanate adding compunds which are selected (a) from compounds having a cycle ring of 3 to 7 ring members, and (b) compounds with at least one active hydrogen atom and at least one salt type group or salt-forming group with the proviso that in case of (a) or of (b) when salt-forming groups are present a neutralizing or quaternizing agent is added. Chain-lengthening agents may be added if desired. The non-crosslinked polyurethanes obtained in this manner receive a more or less greater quantity of reactive alkoxymethyl groups which give them the property of crosslinking under the desired conditions such as increase in temperature, change in pH or removal of solvent or dispersing agent.

It is surprising that the incorporation of highly reactive methylol ethers into polyurethanes give the desired result without premature crosslinking taking place although when a polyurethane modified in this way is applied on a substrate from an aqueous dispersion, it yields crosslinked films at room temperature on evaporation of the water.

Any of the usual components may be used as the polyhydroxy compounds, polyisocyanates and, if these are to be included, chain lengthening agents. Examples are contained in DAS 1,187,012 and in Belgian patent specification 653,223.

Suitable compounds having reactive hydrogen atoms and a molecular weight of 300 to 20,000 and suitable organic polyisocyanates are any of the starting materials customarily used in the isocyanate polyaddition process. Examples are found in DAS 1,187,012 and in Belgian patent specification 653,223. Low molecular weights for the starting materials are preferred, especially for the production of hard synthetic resins and sheet structures.

Any suitable polyalkylene ether glycol may be used including those prepared from tetrahydrofuran, propylene oxide, co-polymerization products or graft polymerization products of these compounds such as the products of the addition of the aforementioned polyalkylene oxides and polystyrene and the like. It is also possible to use mixed polyethers obtained, for example, by the condensation of 1,6-hexanediol, 3-methyl-1,6-hexanediol, 1,7-heptanediol, 1,8-octanediol or the like with or without the addition of 10 to 30% of lower glycols such as, for example, ethylene glycol, 1,2-propanediol and the like. In addition, one may use propoxylated and ethoxylated or mixed propoxylated and ethoxylated glycols such as, propoxylated butanediol or ethoxylated amines such as propoxylated N,N'-dimethyl diethylene diamine and the like.

Any suitable polyhydric polythioether may be used, such as, for example, the condensation product of thiodiglycol with itself or with other glycols such as ethylene glycol, 1,2-propylene glycol and the like as well as those which contain tertiary nitrogen atoms, for example, N,N-dihydroxy-p-ethyl-aniline and the like.

Any suitable polyacetal may be used, but it is preferred to use the water soluble types, for example, those from 1,6-hexanediol and formaldehyde, from 4,4'-dihydroxyethoxydiphenyl-dimethylmethane and formaldehyde and the like.

Any suitable polyester may be used such as, for example, those obtained from polyhydric alcohols and polycarboxylic acids to which diamines and amino alcohols may be added to prepare polyesteramides. Any suitable polyhydric alcohol, but preferably a dihydroxy alcohol such as, for example, diethylene glycol, 1,2-propanediol, 1,4-butanediol, 1,6-hexanediol and the like together with minor amounts of trimethylolpropane, glycerine or the like may be used. Any suitable polycarboxylic acid may be used such as, for example, adipic acid, phthalic acid, terephthalic acid, sebacic acid, suberic acid, azelaic acid or the like together with minor amounts of tricarboxylic acids such as, for example, 1,3,5-benzene tricarboxylic acid and the like. Any suitable diamine such as ethylene diamine or amino alcohols such as ethanolamine may be used.

It is also possible to use polyhydroxyl compounds which contain urethane or urea groups as well as mixtures of the various polyhydroxyl compounds including hydrophilic polyethers, such as polyethylene glycol, polyesters and polyacetals. It is preferred to use predominantly hydrophobic polyhydroxyl compounds and hydrophilic polyhydroxyl compounds should only be used in certain proportions which will not harm the final product. In general, less than about 25% of the polyhydroxy compound should be of the hydrophilic type. It is also possible to use natural polyols such as castor oil, hydroxylated tall oil, carbohydrates and the like.

Any suitable organic polyisocyanate may be used, but it is preferred to use organic diisocyanates and especially aliphatic and aromatic diisocyanates such as, for example, 1,5-naphthylene diisocyanate, 4,4'-diphenylmethane diisocyanate, 4,4'-diphenyldimethylmethane diisocyanate, di- and tetralkyl-diphenylmethane diisocyanate, 4,4'-dibenzyl diisocyanate, 1,3-phenylene diisocyanate, 1,4-phenylene diisocyanate, toluylene diisocyanate, chlorinated and brominated isocyanates, isocyanates containing phosphorous, butane-1,4-diisocyanate, hexane-1,6-diisocyanate, dicyclohexylmethane diisocyanate and cyclohexane-1,4-diisocyanate.

Since the reaction is carried out preferably with the aid of a solvent, various limitation on the choice of components such as have to be made for systems that are free from solvents do not apply. Thus, for example, one may react together polythioethers, aromatic polyisocyanates and basic chain lengthening agents even if such reaction mixtures lead to premature solidification or swelling when reacted without a solvent.

It is also possible within the scope of the present invention to use branched polyhydroxy compounds, polyisocyanates and polyols or polyaminopolyols provided it is not desired to obtain too high a molecular weight for the polyurethane mass.

The proportions used may also vary within wide limits depending on whether soft, flexible or elastic or very hard synthetic resins are to be produced. In the last-mentioned case, the quantity of polyhydroxy compounds need not be more than 10% of the total quantity but may be less.

Among the customary components suitable for building up polyurethane masses, it is especially worth mentioning those compounds which are particularly reactive towards alkoxy methyl groups, e.g. polyester amides, glycols containing amide groups, N,N'-dihydroxyethyl-hexamethylene-bis-urea, N,N'-bis-(2-aminoethyl)-oxalic acid amide, carbodihydrazide, hexane-bis-semicarbazide, γ-hydroxybutyric acid hydrazide, bis-aminosulphonylmethane, 4,4'-bis-(aminomethyl)-dibenzylmethylamine, hydroquinone-bis-hydrazine-ethyl ether, isobutylidene-diureid dihydroxyethylaniline, dihydroxyethyl-m-toluidine, N,N-bis-aminopropyl-m-toluidine and N,N-bis-hydroxyethylmelamine.

The introduction of special acceptor groups into the polyurethanes can also be effected by carrying out the quaternization, during the preparation of the cationic dispersions, with compounds which contain groups that are suitable as acceptors, for example, hydroxyl, urea or carbonamide groups or aromatic radicals which are capable of being substituted. Examples of such compounds are bromoethanol and chloroacetamide.

The special compounds to be included according to the invention, which have at least one isocyanate or isothiocyanate group and at least one alkoxymethyl group are, for example, methoxymethylisocyanate, ethoxymethylisocyanate, n-propoxymethylisocyanate, isopropoxymethylisocyanate, n-butoxymethylisocyanate, isobutoxymethylisocyanate, tertiary butoxymethylisocyanate, amyloxymethylisocyanate, myristylhydroxymethylisocyanate, cetyl hydroxymethylisocyanate, stearylhydroxymethylisocyanate, dodecylhydroxymethylisocyanate, palmitylhydroxymethylisocyanate, oleylhydroxymethylisocyanate and the corresponding isothiocyanates such as, for example, methoxymethylisothiocyanate, ethoxymethylisothiocyanate or isopropoxymethylisothiocyanate.

Preferred alkoxymethylisocyanates and isothiocyanates are methoxymethylisocyanate, ethoxymethylisocyanate and isopropoxymethylisocyanate.

The incorporation of the alkoxymethylisocyanate compounds into the polyurethanes is carried out by the usual methods of polyurethane chemistry, that is they can be simply added to the reaction mixture. Often, room temperature is sufficient, sometimes heating is necessary up to 120° C. to make up for insufficient reactivity of the system. The alkoxymethylisocyanate is reacted with the prefabricated polyurethane which contains either free NCO groups or free hydroxyl groups. The polyurethane can also contain salt type or salt-forming groups. If it does not have such groups, they are introduced into the molecule after reaction with the alkoxymethylisocyanate by adding compounds which are selected (a) from compounds having a cyclic ring of 3 to 7 ring members, and (b) compounds with at least one active hydrogen atom and at least one salt type group or salt-forming group with the proviso that in case of (a) or of (b) when salt-forming groups are present a neutralizing or quaternizing agent is added. Finally, the non-crosslinked mass with alkoxymethyl groups contains salt type groups for dispersing.

In either case, care must be taken to ensure that the alkoxymethyl groups do not already develop their crosslinking action during the process of incorporation. This is achieved by one or other or several of the following measures:

(1) Maintaining temperatures which should not exceed 100° to 120°. Preferably, temperatures below 80° are employed during the incorporation reaction.

(2) Carrying out the polyaddition in the presence of inert solvents such as benzene, toluene, chlorobenzene, acetone, methyl ethyl ketone, diisopropyl ketone, low carboxylic acid esters, dioxane, acetonitrile, tetrahydrofuran, dimethylformamide, dimethylacetamide, dimethylsulphoxide, methylene chloride, chloroform or tertiary butanol, which solvents may also contain small quantities of water, e.g. up to 1%.

(3) Maintaining a neutral to slightly basic reaction in the medium and excluding acids or substances which lower the pH value. If acidic substances are present, the acidity must be attenuated with bases, e.g. with MgO, SnO, $CaCO_3$ or tertiary amines. It is especially advantageous to include chain lengthening agents having tertiary amino groups, e.g. N-methyldiethanolamine or N-cyclohexyldiisopropanolamine, which ensure a slightly basic reaction medium during the whole reaction. The same purpose is fulfilled by the incorporation of carboxylic acid salts, e.g. the sodium or the triethylamine salt of tartaric acid.

These conditions are, however, not essential requirements which must all be fulfilled. Thus, if the reaction medium is sufficiently basic, the reaction may also be carried out at temperatures above 120° C. or without the use of solvents. Conversely, the reaction may in some cases be carried out in a slightly acid medium (pH=6) if the reaction temperature is sufficiently low and the N-alkoxymethyl compound chosen is not too reactive. In particular cases, the reaction will proceed satisfactorily even at a pH of 5.

Polyurethanes with salt type groups useful in the present invention are for instance described in German Auslegeschriften 1,184,946, 1,178,586 and 1,179,363. These references also describe the preparation of polyurethanes with salt-forming groups.

According to a preferred embodiment, the preadduct of polyhydroxy compound and polyisocyanate and, if used, the customary chain lengthening agents is prepared at temperatures between 70 and 150° C. and is then treated at 0 to 150°, preferably 20 to 120°, if desired in solution, with the basic glycols or diamines required for salt formation, e.g. with N-methyldiethanolamine, N-cyclohexyldiisopropanolamine, $\gamma,\gamma'$- bis - aminopropylmethylamine or a sulphide such as thiodiglycol and, if desired, further chain lengthening agents and reacted together. At this stage, the reaction mass is substantially resistant to premature crosslinking and the alkoxymethylisocyanate compound can be incorporated into the polyurethane with salt-forming groups. Salt formation is then carried out in such a manner with the aid of quaternizing agents or neutralizing agents that temperatures of 70° are not exceeded and the pH of the reaction medium does not fall below 3 and preferably a small portion (e.g. 5%) of the tertiary amino groups remains unchanged. This is invariably the case, e.g. when salt formation is carried out with the use of weak acids such as acetic acid even when an excess of acetic acid is used. Neutralizing agents and quaternizing agents are described in the above German Auslegenschriften. Suitable agents are, for instance, hydrochloric acid, hydrobromic acid, nitric acid, sulfuric acid, phosphoric acid, hypophosphoric acid, amidosulphonic acid, hydroxyl amine-monosulphonic acid, fumaric acid, acetic acid, glycollic acid, lactic acid, maleic acid, succinic acid, tartaric acid, oxalic aid, benzoic acid, chloroacetic acid, bromoacetic acid, sorbitol-boric acid, methyl chloride, butyl bromide, dimethyl sulphate, diethyl sulphate, benzyl chloride, methyl-chloromethylether, p-toluene sulphonic acid methyl ester, ethylene bromo hydrine, glycerol-α-bromohydrine, chloroacetic ester, chloroacetamide, bromoacetamide, dibromoethane, p-xylylene dichloride, trimethylamine, triethylamine, tributylamine, pyridine, triethanol amine, dimethyl amino ethanol, methyl morpholine, sodium hydroxide, potassium hydroxide, potassium carbonate, sodium hydrogen carbonate, ammonia, methyl amine, morpholine, aniline, diethanolamine.

It is, of course, also possible to perform salt formation first and then to add the alkoxymethylisocyanate compound to the prefabricated polyurethane already containing salt type groups. This procedure is of interest especially when groups reactive to isocyanates are introduced by the salt formation, as is the case e.g. when alkylating with chloroacetamide, bromoacetamide, bromoethanol or aminodichlorotriazine. A solution of this kind can then be converted into an aqueous colloidal solution or into an aqueous dispersion. Such aqueous colloidal, heterogeneous systems can be stirred indefinitely even at pH values of 3.

Finally, it is also possible to prepare a linear or branched, more or less high molecular weight polyurethane having terminal hydroxyl or amino groups and to react this with an alkoxymethylisocyanate compound before the salt formation. Then, a compound is added which is selected (a) from compounds having a cyclic ring of 3 to 7 ring members, and (b) compounds with at least one active hydrogen atom and at least one salt type group or salt-forming group with the proviso that in case of (a) or of (b) when salt-forming groups are present a neutralizing or quaternizing agent is added.

The alkoxymethyl group content may vary within wide limits and may amount to 2–10 mval./100 g. but may also be 80 to 300 mval./100 g. In the course of the crosslinking reactions, the reactivity of the alkoxymethyl group is determined by the size of the alkoxy radical. Thus, the reactivity decreases from the methoxy to the dodecyl radical so that the reactivity can be adjusted very accurately during the subsequent self-crosslinking.

In the preparation of polyurethanes containing anionic groups, it is usual first to react the preadduct which contains the isocyanate groups with the salt-like component or component capable of salt formation and to add the alkoxymethylisocyanate compound either before or after the groups capable of salt formation are converted into the salt form. The salt-type polyurethane is then converted into dispersions.

Examples of salt-type components suitable for incorporation after the reaction with the alkoxymethylisocyanates are—

(A) Compounds capable of forming a salt:
(1) Compounds having an acid grouping—
(a) Hydroxy acids, such as glyceric acid, lactic acid, trichlorolactic acid, malic acid, dihydroxymaleic acid, dihydroxyfumaric acid, tartaric acid, dihydroxy tartaric acid, citric acid, glyceroboric acid, pentaerythritolboric acid, mannitol-boric acid, salicylic acid, 2,4-dihydroxybenzoic acid, protocatechuic acid, α-resorcylic acid, β-resorcylic acid, hydroquinone-1,5-dicarboxylic acid, 4-hydroxy isophthalic acid, 4,6-dihydroxy isophthalic acid, hydroxyterephthalic acid, 5,6,7,8-tetrahydro-2-naphthol-3-carboxylic acid, 1-hydroxy-2-naphthoic acid, 2,8-dihydroxy-3-naphthoic acid, β-hydroxypropionic acid, m-hydroxybenzoic acid and 2,6-bis-hydroxymethyl-p-cresol;

(b) Aliphatic, cycloaliphatic, aromatic and heterocyclic monoamino and diamino carboxylic acids, such as glycine, α- and β-alanine, 6-aminocaproic acid, 4-aminobutyric acid, the isomeric monoamino and diamino benzoic acids, the isomeric monoamino and diamino naphthoic acids; lysine, ornithin;

(c) Hydroxy-sulfonic and carboxy-sulfonic acids; 2-hydroxyethane sulfonic acid, phenol-2-sulfonic acid, phenol-3-sulfonic acid, phenol-4-sulfonic acid, phenol-2,4-disulfonic acid, sulfoacetic acid, m-sulfobenzoic acid, p-sulfobenzoic acid, benzoic acid-3,5-disulfonic acid, 2-chlorobenzoic acid-4-sulfonic acid, 2-hydroxybenzoic acid-5-sulfonic acid, naphthol-1-sulfonic acid, naphthol-1-disulfonic acid, 8-chloronaphthol-1-disulfonic acid, naphthol-1-trisulfonic acid, naphth-2-ol-1-sulfonic acid, naphthol-2-trisulfonic acid, 1,7-dihydroxy naphthalene-3-sulfonic acid, 1,8 - dihydroxynaphthalene-2,4-disulfonic acid, chlorotropic acid and 2-hydroxynaphthoic-3-carboxylic acid-6-sulfonic acid;

(d) Aminosulfonic acids: hydroxylamine monosulfonic acid, hydrazine disulfonic acid, sulfanilic acid, N-phenylamino methane sulfonic acid, 4,6-dichloroaniline-1-sulfonic acid, phenylene-1,3-diamine-4,6-disulfonic acid, naphthylamine-1-sulfonic acid, naphthylamine trisulfonic acid, 4,4'-di-(p - aminobenzylamino) - diphenyl urea-3,3'-disulfonic acid, phenylhydrazine-2,5-disulfonic acid, taurin, methyltaurin, butyltaurin, ditaurin, 3-aminobenzoic-1-carboxylic acid-5-sulfonic acid, 3-amino-toluene-N-methane sulfonic acid, 4,6-diaminobenzene-1,3-disulfonic acid, 2,4-diaminotoluene-5-sulfonic acid, 4,4-diaminodiphenyl-2,2'-disulfonic acid, 2-amino-phenol-4-sulfonic acid, 4,4'-diaminodiphenylether-2-sulfonic acid, 2-aminoanisol-N-methane sulfonic acid, 2-aminodiphenyl amine sulfonic acid and 2,4-diaminobenzene sulfonic acid;

(e) Hydroxy-carboxylic, aminocarboxylic, hydroxysulfonic, aminosulfonic, polycarboxylic and polysulfonic acids also include addition products of unsaturated acids (such as acrylic acid, methacrylic acid, vinyl-sulfonic acid and styrene-sulfonic acid) and the saponified addition products of unsaturated nitriles (such as acrylonitrile), and cyclic dicarboxylic acid anhydrides (such as maleic, phthalic and succinic anhydrides), and sulfocarboxylic anhydrides (such as sulfoacetic and o-sulfobenzoic anhydrides), and of lactones (such as β-propiolactone and γ-butyrolactone), the addition products of the reaction products of olefines with sulfur trioxide (such as the carbylsulfate) or epoxycarboxylic and epoxysulfonic acids (such as glycidic acid, 2,3-epoxypropane-sulfonic acid), of sultones (such as 1,3-propanesultone, 1,4-butanesultone and 1,8-naphthsultone), of cyclic sulfates (such as glycol sulfate), of disulfonic acid anhydrides (such as benzene-1,2-disulfonic acid anhydride) with: aliphatic and aromatic amines (such as ethylene-1,2-diamine, hexamethylene-1,6-diamine, the isomeric phenylene diamines, diethylene triamine, triethylene tetramine, tetraethylene pentamine and pentaethylene hexamine), alkylated hydrazines, ammonia, amino alcohols (such as hydroxy alkyl substituted amines and hydrazines such as ethanolamine, diethanolamine, triethanolamine, ethanolethylene diamine and ethanolhydrazine), alcohols (such as ethylene glycol, propylene glycol, butane-1,2- and 1,4-diol, hexane-1,6-diol), polyhydric alcohols (such as trimethylolpropane, glycerine and hexanetriol; the (if desired hydrogenated) addition products of epoxy and ethylene imine compounds (such as ethylene oxide, propylene oxide, butylene oxide, styrene oxide, and ethylene imine), and unsaturated nitriles, such as acrylonitrile, with aliphatic and aromatic amino carboxylic and amino sulfonic acids; the reaction products of hydroxy-alkane-sulfonic acids, halocarboxylic acids and halosulfonic acids, with hydrazines or alkylated hydrazines (such as hydrazine-acetic acid, hydrazine-ethanesulfonic acid and hydrazine-methanesulfonic acid); the saponified addition products of cyanhydrins with hydrazines (such as 1,2-hydrazine-bis-isobutyric acid); also the addition products of sodium hydrogen sulfite with olefinically unsaturated compounds (such as allyl alcohol, maleic acid, maleic-bis-ethylene and maleic-bis-propylene glycol esters;

(f) Hydrazine-carboxylic acids, such as hydrazine-dicarboxylic acids.

(2) Reactive cyclic compounds with 3 to 7 ring members, comprising salt-like groups or groups which are capable of forming a salt after opening of the ring, such as—

(a) Dicarboxylic anhydrides, such as succinic anhydride, maleic anhydride, phthalic anhydride or hydrogenated phthalic anhydride;

(b) Tetracarboxylic dianhydrides, such as benzene-1,2,4,5-tetracarboxylic dianhydride;

(c) Disulfonic anhydrides, such as benzene-1,2-disulfonic-anhydride;

(d) Sulfocarboxylic anhydrides, such as sulfoacetic anhydride and o-sulfobenzoic anhydride;

(e) Sultones, such as propane-1,3-sultone, butane-1,4-sultone and naphth-1,8-sultone;

(f) Lactones, such as β-propiolactone and γ-butyrolactone;

(g) Epoxycarboxylic acids, such as glycidic acid, optionally in the form of their alkali metal salts;

(h) Epoxysulfonic acids, such as 2,3-epoxypropane-1-sulfonic acid, if desired in the form of their alkali metal salts, as well as the addition products of epoxy aldehydes and alkali metal hydrogen sulfites, such as, for example, the bisulfite compound of glycide aldehyde;

(i) Reaction products of olefines with sulfur trioxide, such as carbysulfate;

(j) Cyclic sulfates, such as glycol sulfate.

(B) Compounds carrying groups which can be quaternized or neutralized with acids.

(1) Alcohols: particularly alkoxylated aliphatic, cycloaliphatic, aromatic and heterocyclic secondary amines such as N,N-dimethyl ethanolamine, N,N-diethylethanolamine, N,N-dibutylethanolamine, dimethylaminopropanol-(2), N,N-methyl-beta-hydroxyethylaniline, N,N-methyl-beta-hydroxpropyl aniline, N,N-ethyl-beta-hydroxyethylaniline, N,N-butyl-beta-hydroxyethylaniline, N-oxethylpiperidine, N-oxethylmorphaline, alpha-hydroxyethyl pyridine and beta-hydroxy ethylquinoline, as well as phosphines such as diethyl-beta-hydroxyethylphosphine.

(2) Diols and triols: particularly alkoxylated aliphatic, cycloaliphatic, aromatic and heterocyclic primary amines such as N-methyl diethanolamine, N-butyl diethanolamine, N-oleyl-diethanolamine, N-cyclohexyldiethanolamine, N-methyldiisopropanolamine, N-cyclohexyl-diisopropanolamine, N,N-dioxethyl aniline, N,N-dioxethyl-m-toluidine, N,N-dioxethyl-p-toluidine, N,N-dihydroxypropyl - naphthylamine, N,N-dioxethyl-alpha-aminopyridine, dioxethyl piperazine, N,N-di-(n-2,3-dihydroxypropyl)-aniline, dimethyl-N,N'-bis-oxethyl hydrazine, N,N'-dimethyl-N,N'-bishydroxypropyl-ethylene diamine, as well as phosphines such as methyl-bis-beta-hydroxyethyl phosphine and tris-hydroxymethyl phosphine as well as thiodiethylene glycol.

(3) Aminoalcohols: such as the addition products, obtained by hydrogenation, of alkylene oxide and acrylonitrile, with primary amines such as N-methyl-N-(3-aminopropyl)-ethanolamine, N-cyclohexyl-N-(3-aminopropyl)-propanol - 2 - amine, N,N-bis-(3-aminopropyl)-ethanolamine and N-3-aminopropyl-diethanolamine.

(4) Amines: such as N,N-dimethyl hydrazine, N,N-dimethylethylene diamine, 1-diethylamino-4-aminopentane, alpha-aminopyridine, 3-amino-N-ethyl carbazole, N,N-dimethylpropylene diamine, N-aminopropyl piperidine, N-aminopropyl morpholine, N-aminopropylethylene diamine and 1,3-bis-piperidine-2-aminopropane.

(5) Diamines, triamines and amides: such as the compounds obtained by hydrogenation of addition products of acrylonitrile with primary and secondary amines, such as bis-(3-aminopropyl)-methylamine, bis-(3-aminopropyl)-cyclohexylamine, bis-(3-aminopropyl)-aniline, bis-(3-aminopropyl)-toluidine, diaminocarbazole, bis-(aminopropoxethyl)-butylamine, tris - (aminopropyl) - amine, N,N'-bis-carbonamidopropyl-hexamethylene diamine, as well as the compounds obtained by the addition of acrylamide with diamines and diols.

(C) Compounds containing halogen atoms capable of quaternization reactions or corresponding esters of strong acids:

(1) Alcohols and amines: such as, for example, 2-chloroethanol, 2-bromoethanol, 4-chlorobutanol, 3-bromopropanol, beta-chloroethylamine, 6-chlorohexylamine, ethanolamine sulphuric acid esters, N,N-bis-hydroxyethyl-N'-m-chloromethylphenyl urea, N-hydroxyethyl-N'-chlorohexyl urea, glycerinamino-chloroethyl urethane, chloroacetyl ethylene diamine, bromoacetyl dipropylene triamine, glycerin-alpha-bromohydrin, trichloroacetyl-triethylene tetramine, 1,3-dichloro-2-propanol, and glycerine-alpha-chlorohydrin which may be alkoxylated.

(2) Isocyanates: such as, for example, chlorohexyl isocyanate,
m-chloromethylphenyl isocyanate,
p-chlorophenyl isocyanate,
bis-chloromethyldiphenylmethane diisocyanate,
2,4-diisocyanato-benzyl chloride,
2,6-diisocyanatobenzyl chloride and
N-(4-methyl-3-isocyanatophenyl)-beta-bromoethyl urethane.

In case of compounds with salt-forming groups, the products have to be converted into the salt by adding the above quaternizing or neutralizing agents, before the preparation of the dispersion.

In a special method of carrying out the process, the groups capable of salt formation are only partly converted into the salt form so that free acid groups not yet converted into the salt form are still present. The pH can then be adjusted to the desired value in accordance with the mass action law by the ratio of free acidic groups to the acid groups converted into the salt form, this being achieved by adding only the calculated quantity of compound which imparts the salt-like character to the polyurethane, e.g. triethylamine or potassium hydroxide solution. Thus, it is possible a priori to use a pH of e.g. 5 without gel formation setting in. The acidity may, of course, also be adjusted by subsequent addition of acids or alkalies to the dispersion or aqueous colloidal solution.

The more strongly marked the salt-like character of a cationic or anionic polyurethane is, the milder may be the subsequent conditions under which cross-linking will take place. The minimum conditions can easily be determined in the individual case by a preliminary test. For this purpose, samples of the solution or dispersion of the polyurethane mass in water and/or organic solvents are adjusted to pH values between 7 and 2, e.g. by means of ammonia, acetic acid or formic acid, and are then poured onto supports and dried at room temperatures. The dry samples are divided up and after-heated at 50°, 80°, 100° and 120° respectively. Insolubility in 80 to 95% aqueous tetrahydrofuran indicates that crosslinking has set in.

Crosslinking is favored by low pH values, elevated temperatures, high content in urethane groups, aliphatic isocyanates as incorporated components, if possible more favorable acceptor groups than urethane, e.g. urea, carbonamide or hydrazide groups.

Under favorable conditions, crosslinking will take place even during drying of the solutions or dispersions at room temperature. In other cases, the dried or still moist layers will have to be after-heated at 40 to 150° (preferably 40 to 80°) for 2 to 60 minutes.

The products of the process, which have good resistance to water and oil even if they are hydrophilic, are used primarily as coatings and impregnations for many different types of substrates, as adhesifying agents and for elastic films, foils and filaments.

The invention is further illustrated but not limited by the following examples in which parts are by weight unless otherwise specified.

EXAMPLE 1

About 212.5 parts of a polyester of adipic acid, hexanediol and neopentyl glycol (OH number 65.85) are dehydrated at about 120° C. and about 12 mm. Hg and reacted for about 2 hours at about 120° C. with about 52 parts 1,6-hexane diisocyanate. The melt is dissolved in 1000 parts by volume of tertiary butanol and added at room temperature to a solution of about 18.1 parts bis-($\gamma$-aminopropyl)-methylamine and about 6.44 parts diethylene triamine in about 1000 parts by volume of tertiary butanol. After stirring for a further 30 minutes, about 5.4 parts methoxymethyl isocyanate are added. A part of the organic solvent is distilled off in vacuo at about 60° and about 11.9 parts dimethylsulphate are then added and about 900 parts by volume of water introduced dropwise. When the remaining tertiary butanol has been distilled off, a dispersion which has a pH value of 8 is obtained. The pH of the dispersion is adjusted to 5 by the addition of acetic acid and then poured out to form a film. The film dries at room temperature to a crosslinked film which is resistant to solvents.

The mechanical properties of the foil are as follows:

Tensile strength _____kg. wt./cm.$^2$__ 19
Tension at 100% _____kg. wt./cm.$^2$__ 3.5
Tension at 500% _____kg. wt./cm.$^2$__ 6.7
Elongation on tearing _____percent__ 795
Tear propagation resistance _____kg. wt./cm.__ 5.7

EXAMPLE 2

About 218.5 parts of a polyester of adipic acid, hexanediol and neopentyl glycol (OH number 63) are dehydrated in a vacuum for about one-half hour at about 120° C. and reacted for about 2 hours at about 120° C. with about 63 parts 1,6-hexane diisocyanate. The melt is cooled to about 70° and taken up in 1000 parts by volume of tertiary butanol. The solution of the prepolymer in tertiary butanol is added at room temperature to about 26 parts diethylene triamine in about 1000 parts by volume of tertiary butanol and after a further one-half hour stirring at about 25° C., it is treated with about 8.7 parts methoxymethylisocyanate. After termination of the addition reaction, about 15 parts succinic anhydride in about 100 parts by volume acetone are added. After a reaction time of about 30 minutes at about 25° C., about 7.6 parts of triethylamine are added. About 760 parts by volume water are added to the reaction mixture and the tertiary butanol is distilled off. About 860 parts of a milky white, solvent-free latex is obtained which has a solids content of about 43% and a pH value of 5. The latex is stable and can be stored indefinitely. On drying, the latex on the surface at room temperature, clear, transparent, elastic films of high tensile strength are obtained which are insoluble in 90% aqueous acetone and in 80% aqueous tetrahydrofuran. The crosslinked products are also insoluble in trichloroethylene and in dimethylformamide.

The mechanical properties of the films crosslinked at room temperature as follows:

Tensile strength _____kg. wt./cm.$^2$__ 111
Tension at 100% _____kg. wt./cm.$^2$__ 15
Tension at 500% _____ kg. wt./cm.$^2$__ 45
Elongation on tearing _____percent__ 584

Permanent elongation at breakafter 1 minute do____ 2
Tear propagation resistance _____kg. wt./cm.__ 11
Permeability to steam according to DIN
53122 _____g./m.² day__ 8.3
Water uptake according to DIN 53472/5/2 after 8
days _____percent__ 66.3

For comparison, a dispersion capable of crosslinking is prepared by a method analogous to that described above from about 218.5 parts of a polyester of adipic acid, hexanediol and neopentyl glycol (OH number 63), about 42.0 parts 1,6-hexane diisocyanate, about 12.9 parts diethylene triamine, about 12.5 parts succinic anhydride and about 6.3 parts triethylamine without the use of methoxymethylisocyanate. This dispersion dries to form soft, slightly sticky films which are soluble in 90% aqueous acetone.

The mechanical values of the non-crosslinked films obtained in this way are as follows:

Tensile strength _____kg. wt./cm.²__ 2.4
Tension at 100% _____kg. wt./cm.²__ 3.5
Tension at 500% _____kg. wt./cm.²__ 3.5
Elongation on tearing _____percent__ 4000
Permanent elongation at break after 1 min. _do____ 100
Tear propagation resistance _____kg. wt./cm.__ 3.6
Permeability to steam according to DIN 53122
g.m.² day__ 18.9
Water uptake according to DIN 53472/5/2 after
8 days _____percent__ 102

EXAMPLE 3

A prepolymer is prepared at about 120° C. from about 109.2 parts of a polyester of adipic acid, hexanediol and neopentyl glycol (OH number 63) which is dehydrated in vacuo at about 120° C. and about 31.5 parts 1,6-hexane diisocyanate, and after cooling to bout 70° C., this prepolymer is dissolved in about 1000 parts by volume of tertiary butanol. After addition of the prepolymer solution to about 12.9 diethylenetriamine in about 1000 parts by volume of tertiary butanol, a reactive polyurethane is obtained which is reacted with about 2.7 parts methoxymethylisocynate. After the addition of about 9.4 parts succinic anhydride in about 100 parts by volume acetone, the reaction mixture is stirred for about 30 minutes at about 25° C. and then treated with about 6.3 parts triethylamine. After dropwise addition of about 450 parts by volume of water, the organic solvent is distilled off in vacuo. A solvent-free, stable, aqueous colloidal opaque solution having a solids content of 40.3% is obtained which dries at room temperature to form films which have good tensile strength and are resistant to solvents. The pH of the dispersion is 5. After storage in water free from electolytes, the films manifest considerable water uptake without, however, disintegrating. Development of the optimum properties is accelerated by brief tempering at about 120° C.

EXAMPLE 4

A prepolymer prepared from about 212.5 parts of a polyester of adipic acid, hexanediol and neopentyl glycol (OH number 65.85) and about 42.0 parts 1,6-hexane diisocyanate is dissolved in about 800 parts by volume acetone and added at room temperature, with stirring, to a solution of about 18.1 parts bis-(γ-aminopropyl)-methylamine in about 500 parts by volume acetone. After the addition of about 10.8 parts methoxymethyl isocyanate, the reaction mixture is stirred for about 2 hours at about 55° C. About 7.9 parts dimethylsulphate are then added and the mixture stirred for a further 30 minutes at about 55° C. About 580 parts by volume of water are then added and the acetone distilled off. A white, 38% dispersion remains behind which has a pH of 8. The dispersion is adjusted to pH 4 with formic acid and shaped into foils.

A marked decrease in swelling in the presence of water is found compared with foils which are not cross-linked.

EXAMPLE 5

The preadduct prepared from about 212.5 parts of a polyester of adipic acid, hexanediol and neopentylglycol (OH number 65.85) and about 42.0 parts 1,6-hexane diisocyanate are dissolved in about 800 parts by volume acetone and added to about 18.1 parts bis-(γ-aminopropyl)-methylamine in about 500 parts by volume acetone. The basic polyurethane is then reacted with about 12.5 parts bromoethanol for about 2 hours at about 55° C. and after the addition of about 4.4 parts methoxymethylisocyanate it is stirred for an additional hour. About 600 parts by volume of water are then added dropwise and the organic solvent removed in vacuo. The cationic polyurethane dispersion obtained has a pH value of 8 and is capable of undergoing self-crosslinking only after it has been made acid with formic acid or acetic acid, this self-crosslinking being completed by heating for about 10 minutes at about 140° C.

EXAMPLE 6

About 250 parts of a polyester of adipic acid, phthalic acid and ethylene glycol of OH number 64 are reacted, after dehydration, with about 21 parts 1,6-hexamethylene diisocyanate for about 30 minutes at about 110° C. and then with about 50 parts toluylene diisocynate for about one hour at about 80° C. At about 30° C., a solution of about 25 parts N-methyldiethanolamine in about 125 parts by volume of acetone is added and the resulting solution stirred for about 4 hours at about 50° C. A further 165 parts by volume acetone are then added and, when the solution has again become viscous, a further 260 parts by volume acetone are added.

About 150 parts of this solution are stirred with about 3 parts methoxymethylisocyanate for about 12 hours at about 60° C. and then reacted with about 0.15 part by volume of dimethylsulphate and about 0.7 part of 1,3-bis-chloromethyl-4,6-dimethylbenzene for about 1 hour at about 50° C. About 1.5 parts by volume glacial acetic acid, about 1 part by volume phosphoric acid and about 0.1 part by volume triethylphosphate in about 8 parts by volume of water are then added, the solution is diluted with about 12.5 parts by volume of water and the acetone distilled off. An opaque, aqueous colloidal, 37% polyurethane solution is obtained which is adjusted to pH 3.5 with acetic acid.

When the solution is dried on a surface at room temperature, a clear, flexible, mechanically resistant coating is obtained which undergoes strong swelling in aqueous tetrahydrofuran. About 15 minutes after-heating at about 120° C., yields a material which swells only slightly.

EXAMPLE 7

About 500 parts of the above polyester are reacted, without dehydration, at about 80° C. with about 304 parts toluylene diisocyanate (isomeric mixture 65:35) for about one hour. At about 30° C., about 70 parts of 1,4-butanediol and about 70 parts of N-methyl-diethanolamine dissolved in about 400 parts by volume of acetone are added within about 10 minutes. The reaction mixture is then stirred at about 50° C. About 400 parts by volume of acetone are added after about 20 hours, 50 minutes and about 700 parts by volume after about one hour, 25 minutes. After a further hour, about 5 parts by volume of methanol are added.

About 300 parts of the polyurethane solution in acetone are stirred with about 5 parts methoxymethylisocyanate for about 8 hours at about 60° C. The solution is then treated with about 3 parts by volume glacial acetic acid and about 2 parts by volume phosphoric acid (85%) in about 16 parts by volume of water, diluted with about 250 parts by volume water and freed from acetone by distillation. A solution adjusted to pH 3 with formic acid or acetic acid dries at room temperature to form a transparent, hard, flexible foil which is soluble in 70% tetrahydrofuran. It is rendered insoluble by after-heating at about 120° C. for about 30 minutes. If the solution has previously been acidified to pH 2, insolubility already sets in on after-heating to about 80° C.

It is of course to be understood that any of the active hydrogen containing compounds, polyisocyanates, chain extenders, compounds containing salt forming groups or alkoxy methyl isocyanates may be used throughout the examples for those specifically used therein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for the preparation of self-crosslinking dispersions or aqueous colloidal solutions of polyurethanes which comprises reacting a polyurethane with free NCO-groups or free hydroxyl groups and prepared essentially from an organic polyisocyanate and an organic compound containing active hydrogen atoms that are reactive with NCO-groups, said compounds having a molecular weight of 300 to 20,000, at a temperature of from room temperature to 120° C., with a compound containing at least one isocyanate or one isothiocyanate group and at least one alkoxymethyl group and thereafter with a compound which is selected (a) from compounds having a cyclic ring of 3 to 7 ring members and selected from the group consisting of dicarboxylic acid anhydrides, tetracarboxylic acid dianhydrides, disulfonic acid anhydrides, sulfocarboxylic anhydrides, sultones, lactones, epoxycarboxylic acids, epoxysulfonic acids, reaction products of olefines of sulfur trioxide and cyclic sulfates, and (b) compounds with at least one active hydrogen atom and at least one salt-type group or salt-forming group with the proviso that in case of (a) or of (b) when salt-forming groups are present a neutralizing or quaternizing agent is added, and dispersing the thus formed modified polyurethane in an aqueous solution or dispersion.

2. A process for the preparation of self-crosslinking dispersions or aqueous colloidal solutions of polyurethanes which comprises reacting a polyurethane with free NCO groups or free hydroxyl groups and containing salt-type or salt-forming groups and prepared essentially from an organic polyisocyanate and an organic compound containing active hydrogen atoms that are reactive with NCO groups, said compounds having a molecular weight of 300 to 20,000 at a temperature of from room temperature to 120° C., with a compound containing at least one isocyanate or one isothiocyanate group and at least one alkoxymethyl group and thereafter reacting with a neutralizing agent or quaternizing agent when said polyurethane contains salt-forming groups, and dispersing the thus formed modified polyurethane in an aqueous solution or dispersion.

3. The process according to claim 1 wherein the alkoxymethyl group is a methoxymethyl group.

4. The process according to claim 2 wherein the alkoxymethyl group is a methoxymethyl group.

5. The process of claim 1 wherein the compound containing at least one isocyanate isothiocyanate group and at least one alkoxy group is an alkoxymethyl isocyanate.

6. The process of claim 2 wherein the compound containing at least one isocyanate isothiocyanate group and at least one alkoxy group is an alkoxymethyl isocyanate.

7. The process of claim 5 wherein the alkoxymethyl isocyanate is methoxymethyl isocyanate.

8. The process of claim 6 wherein the alkoxymethyl isocyanate is methoxymethyl isocyanate.

9. A self-crosslinking dispersion or aqueous colloidal solution prepared by the process of claim 1.

References Cited

UNITED STATES PATENTS

| | | | |
|---|---|---|---|
| 3,242,230 | 3/1966 | Habib | 260—29.4 |
| 3,384,606 | 5/1968 | Dieterich et al. | 260—29.4 |

SAMUEL H. BLECH, *Primary Examiner.*

J. C. BLEUTGE, *Assistant Examiner.*

U.S. Cl. X.R.

117—161; 260—9, 29, 75, 77.5, 849, 850